June 13, 1939. K. G. TELL 2,161,837
GUARD FOR AUTOMOBILES
Filed March 8, 1938 3 Sheets-Sheet 2
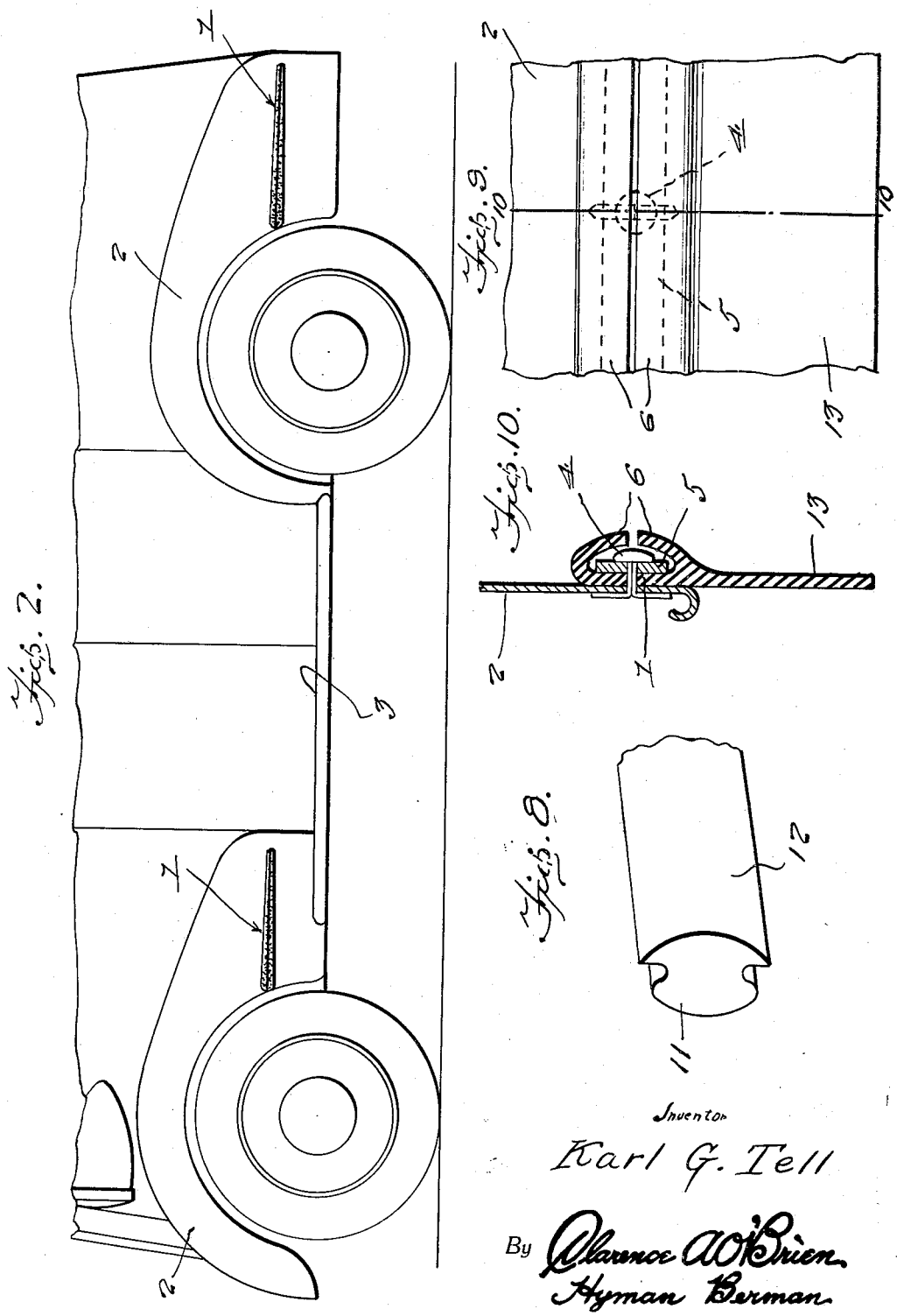
Inventor
Karl G. Tell
By Clarence A. O'Brien
Hyman Berman
Attorneys June 13, 1939.  K. G. TELL  2,161,837
GUARD FOR AUTOMOBILES
Filed March 8, 1938   3 Sheets-Sheet 3

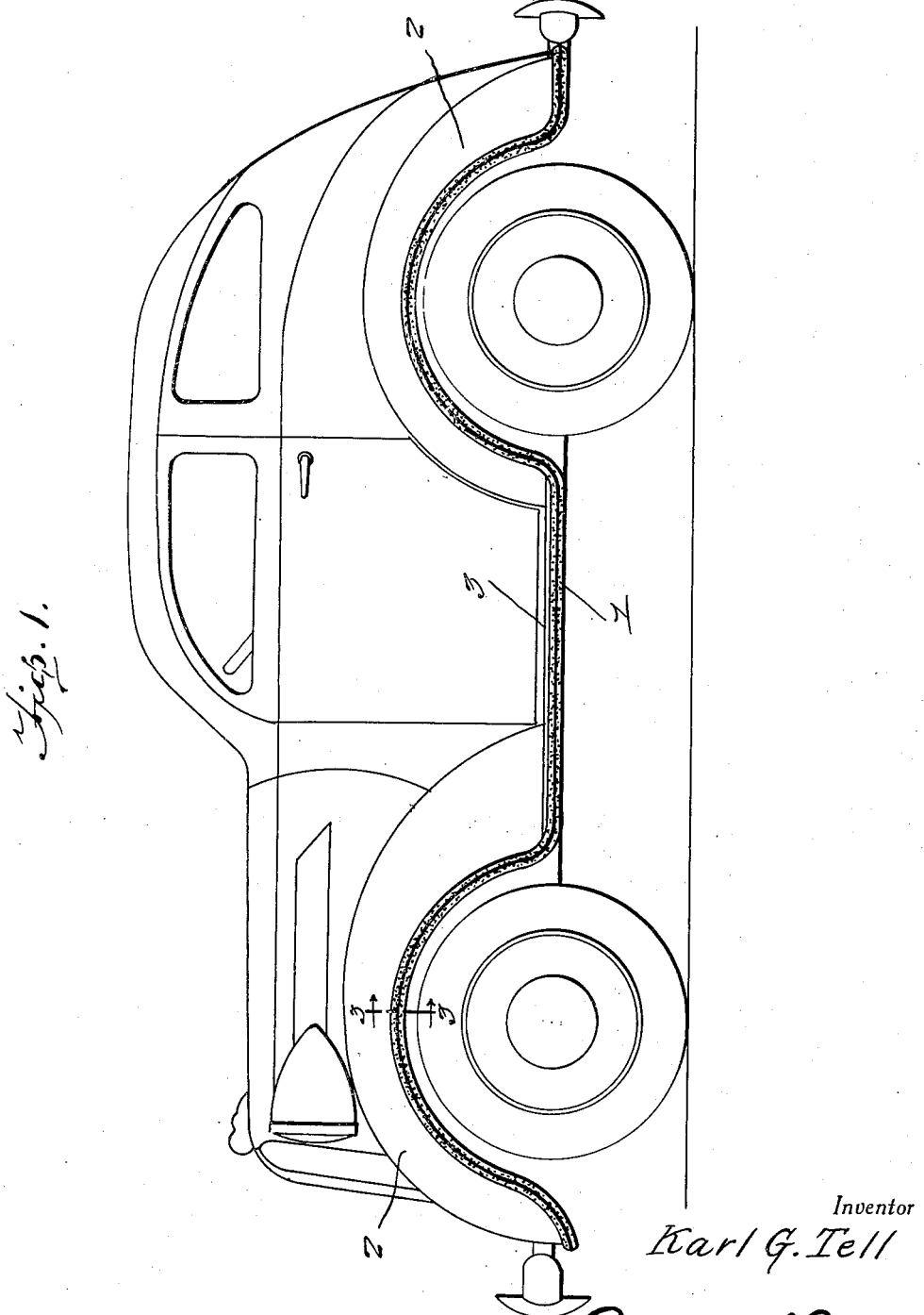

Inventor
Karl G. Tell
By Clarence A. O'Brien
Hyman Berman
Attorneys

Patented June 13, 1939

2,161,837

UNITED STATES PATENT OFFICE 2,161,837

GUARD FOR AUTOMOBILES

Karl G. Tell, Detroit, Mich.

Application March 8, 1938, Serial No. 194,691

4 Claims. (Cl. 280—152)

The present invention relates to new and useful improvements in guards particularly for automobiles and has for its primary object to provide, in a manner as hereinafter set forth, novel means for protecting the fenders and running boards against damage.

Other objects of the invention are to provide a guard of the aforementioned character for motor vehicles which will be comparatively simple in construction, strong, durable, attractive in appearance and which may be manufactured and installed at low cost.

All of the foregoing and still further objects and advantages of the invention will become apparent from a study of the following specification, taken in connection with the accompanying drawings wherein like characters of reference designate corresponding parts through the several views, and wherein:

Figure 1 is a view in side elevation of an automobile equipped with an embodiment of the invention.

Figure 2 is a view in side elevation of a portion of an automobile, showing a different application of the invention.

Figure 8 is a perspective view of an end portion of the modified form of guard shown in Fig. 7.

Figure 9 is a fragmentary view in front elevation of still another modification.

Figure 10 is a cross sectional view, taken substantially on the line 10—10 of Fig. 9.

Figure 3:
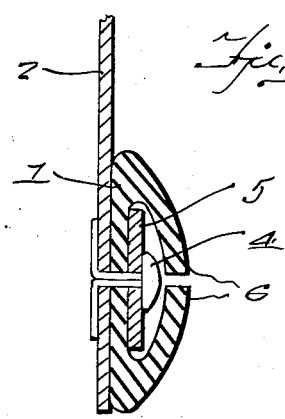
Figure 3 is a sectional view, taken substantially on the line 3—3 of Fig. 1.
Figure 4:
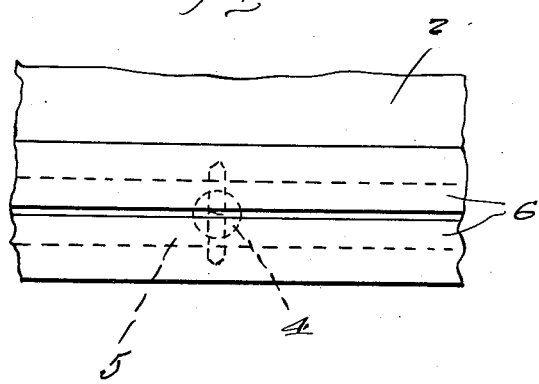
Figure 4 is a fragmentary view in front elevation, showing a portion of the embodiment of the invention shown in Fig. 3.

Referring now to the drawings in detail, and Figs. 1, 3 and 4 thereof in particular, it will be seen that the reference numeral 1 designates a strip of suitable resilient material, preferably rubber, which is adapted to be mounted on the marginal portions of the fenders and running boards 2 and 3, respectively, of an automobile 4. The rubber strips 1 may be of any suitable width and thickness. Split rivets 4 (see Fig. 3) secure the rubber strip 1 in position. The rivets 4 secure a metallic strip 5 against the outer side of the rubber strip 1. The construction and arrangement is such that the rubber strip 1 is clamped between the metallic strip 5 and the fender or running board of the vehicle. Formed integrally with the upper and lower marginal portions of the rubber strip 1 are resilient flaps 6 or the like which extend over the rivets 4 and the metallic strip 5 in a manner to substantially conceal same. If desired, the rubber strips 1 may be mounted longitudinally on intermediate portions of the fenders of the vehicle, as seen in Fig. 2 of the drawings, instead of on the marginal portions of said fenders. Also, the guards may taper toward their rear ends, as seen in Fig. 2 of the drawings.

Figure 5:
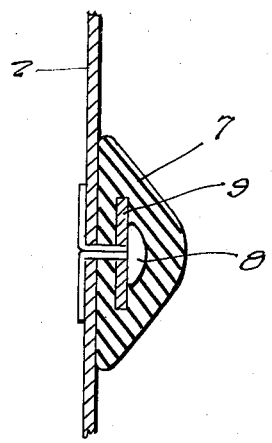
Figure 5 is a cross sectional view through a modified form of guard.
Figure 6:
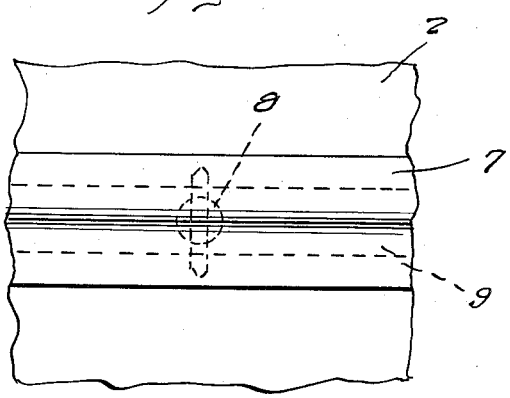
Figure 6 is a view in front elevation, showing a portion of the modified guard illustrated in Fig. 5.

Referring now to Figs. 5 and 6 of the drawings, it will be seen that the reference numeral 7 designates a rubber strip of substantially triangular cross section which may be substituted for the strip 1 and mounted as illustrated in Figs. 1 and 2 of the drawings. The substantially triangular rubber strip 7 is secured in position through the medium of split rivets 8 which are embedded therein. A metallic reinforcing strip 9, which is also embedded in the rubber strip 7, anchors the rivets 8.

Figure 7:
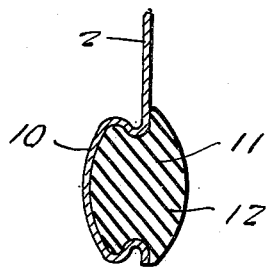
Figure 7 is a cross sectional view through another modification.

In the modification shown in Figs. 7 and 8 of the drawings, a substantially C-shaped marginal channel or groove 10 is provided in the fenders and running boards of the vehicle. The channel 10 is for the reception of a rubber strip 11 of a cross sectional shape corresponding substantially to said channel and including a substantially arcuate projecting outer portion 12. The resiliency of the rubber strip 11 retains it in the channel 10, said rubber strip being compressed when it is inserted.

The form of the invention shown in Figs. 9 and 10 of the drawings is substantially similar to the embodiment illustrated in Figs. 3 and 4 with the exception that an integral, depending flexible apron 13 is provided which extends below the fenders or the running boards of the automobile. The apron or flap 13 is for the purpose of catching mud, water, etc., thrown or splashed by the wheels of the vehicle.

It is believed that the many advantages of an automobile guard constructed in accordance with the present invention will be readily understood and although preferred embodiments of the device are as illustrated and described, it is to be understood that further modifications and changes in the details of construction may be resorted to which will fall within the scope of the invention as claimed. For example, instead of rubber, the guard strip may be of metal or any other suitable material, thereby doing away with the necessity of a reinforcing element. Further the invention may be used on vehicles other than automobiles, such as street cars, boats, trailers, etc., also on various appliances.

What is claimed is:

1. A guard of the class described for automobiles comprising a substantially flat, resilient strip engageable with an automobile, securing elements mounted in and passing through said strip for fastening same to the automobile, and resilient, external flaps integral with the longitudinal marginal portions of the resilient strip extending inwardly over the securing elements and substantially concealing said elements.

2. A guard of the class described for automobiles comprising a substantially flat, resilient strip, headed rivets mounted in said strip at longitudinally spaced points for anchoring said strip to the automobile, a metallic strip interposed between the heads of the rivets and the resilient strip, and resilient, external flaps integral with the longitudinal marginal portions of the resilient strip and extending inwardly over the rivets and the metallic strip and substantially concealing said rivets and said metallic strip.

3. A guard of the class described for automobiles comprising a resilient strip engageable with an automobile, securing elements mounted in and passing through said resilient strip for fastening same to the automobile, longitudinal flaps integral with the marginal portions of the resilient strip and extending inwardly over the securing elements for substantially concealing same, and an apron integral with one of the marginal portions of the resilient strip and depending therefrom.

4. A guard of the class described for automobiles comprising a substantially flat, resilient strip engageable with an automobile, headed rivets mounted in the resilient strip at longitudinally spaced points for securing said resilient strip on the automobile, a metallic strip interposed between the heads of the rivets and the resilient strips, longitudinal flaps integral with the marginal portions of the resilient strip and extending inwardly over the rivets and the metallic strip for substantially concealing some, and an apron integral with one of the longitudinal marginal edges of the resilient strip and depending therefrom.

KARL G. TELL.